(12) United States Patent
Xu et al.

(10) Patent No.: US 11,248,518 B2
(45) Date of Patent: Feb. 15, 2022

(54) THERMOSTAT FOR CONTROLLING COOLANT CIRCUIT

(71) Applicant: Volvo Car Corporation, Gothenburg (SE)

(72) Inventors: Yongping Xu, Shanghai (CN); Xuexiang Cao, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 188 days.

(21) Appl. No.: 16/575,454

(22) Filed: Sep. 19, 2019

(65) Prior Publication Data

US 2020/0173343 A1    Jun. 4, 2020

(30) Foreign Application Priority Data

Dec. 3, 2018  (CN) .......................... 201811462888.5

(51) Int. Cl.
*F01P 7/02*     (2006.01)
*F01P 7/16*     (2006.01)
(Continued)

(52) U.S. Cl.
CPC ............... *F01P 7/165* (2013.01); *F01P 11/04* (2013.01); *G05D 23/022* (2013.01)

(58) Field of Classification Search
CPC ........ F01P 7/16; F01P 2007/146; F01P 7/165; F01P 11/04; G05D 23/022
(Continued)

(56) References Cited

U.S. PATENT DOCUMENTS 3,154,249 A * 10/1964 Saliaris ................ G05D 23/022
                                                    236/34
3,395,580 A *  8/1968 Kuze .................... G05D 23/022
                                                    60/527
(Continued)

FOREIGN PATENT DOCUMENTS

EP     0587981 A1 *  3/1994  ................ F01P 7/16
EP     0587981 A1     3/1994
(Continued)

OTHER PUBLICATIONS

Jan. 13, 2020 European Search Report issued on International Application No. 19207139.

*Primary Examiner* — Hung Q Nguyen
*Assistant Examiner* — Anthony Donald Taylor, Jr.
(74) *Attorney, Agent, or Firm* — Clements Bernard Walker; Christopher L. Bernard

(57) ABSTRACT

A thermostat for controlling a coolant circuit comprising: a housing assembly defining an internal cavity and first and second inlets for establishing fluid communication between the internal cavity and the coolant circuit; a wax pack arranged in the internal cavity, the wax pack comprising a push bar and a wax pack body; a blocking frame configured to be driven by the wax pack body to open/close the first inlet; and a main valve block configured to be driven by the wax pack body and/or the blocking frame to open/close the second inlet; wherein the wax pack body comprises: a casing in which wax is filled; a rubber hose having a cylindrical body inserted in the casing; and a cover having a clamping portion clamped onto the casing to seal the rubber hose between the casing and the cover.

20 Claims, 5 Drawing Sheets

(51) Int. Cl.
*F01P 11/04* (2006.01)
*G05D 23/02* (2006.01)

(58) Field of Classification Search
USPC .................................. 123/41.08; 236/34.5
See application file for complete search history.

(56) References Cited

U.S. PATENT DOCUMENTS

| | | | | | |
|---|---|---|---|---|---|
| 4,666,081 | A | * | 5/1987 | Cook | ...................... F01P 7/167 |
| | | | | | 236/34.5 |
| 4,948,043 | A | * | 8/1990 | Kuze | .................... G05D 23/021 |
| | | | | | 236/34.5 |
| 6,742,716 | B1 | * | 6/2004 | Duprez | .................. F01P 7/167 |
| | | | | | 236/34.5 |
| 7,175,102 | B2 | * | 2/2007 | Inoue | ...................... G01K 5/44 |
| | | | | | 236/100 |
| 8,651,069 | B2 | * | 2/2014 | Borgia | ............... G05D 23/1333 |
| | | | | | 123/41.04 |
| 8,973,537 | B2 | * | 3/2015 | Lee | ......................... F01P 7/167 |
| | | | | | 123/41.58 |
| 2004/0163612 | A1 | * | 8/2004 | Takahashi | .......... G05D 23/1333 |
| | | | | | 123/41.1 |
| 2008/0111092 | A1 | * | 5/2008 | Komurian | ................. F01P 7/14 |
| | | | | | 251/149 |
| 2012/0279462 | A1 | * | 11/2012 | Warnery | .................. F01P 11/16 |
| | | | | | 123/41.08 |
| 2014/0374495 | A1 | * | 12/2014 | Malone | ..................... F01P 7/14 |
| | | | | | 236/34.5 |
| 2015/0144078 | A1 | * | 5/2015 | Hutchins | .................. F01P 7/16 |
| | | | | | 123/41.1 |

FOREIGN PATENT DOCUMENTS

| | | |
|---|---|---|
| EP | 1903265 A1 | 3/2008 |
| WO | 0208585 A1 | 1/2002 |
| WO | 2013178798 A1 | 12/2013 |

\* cited by examiner

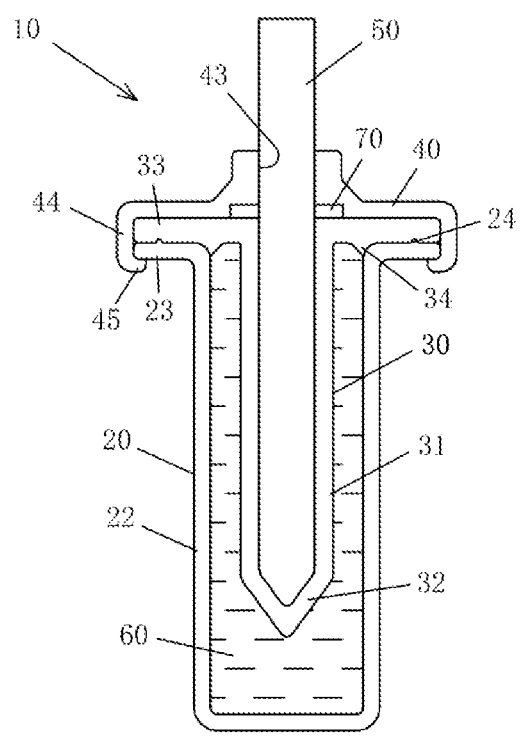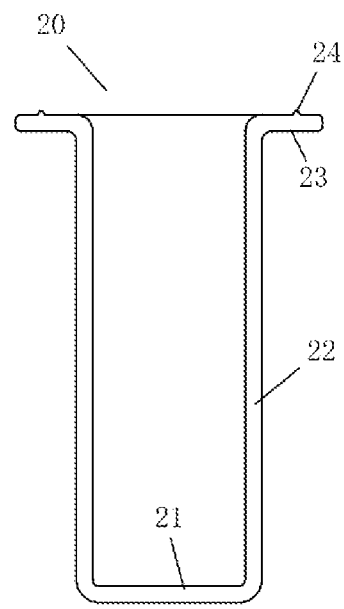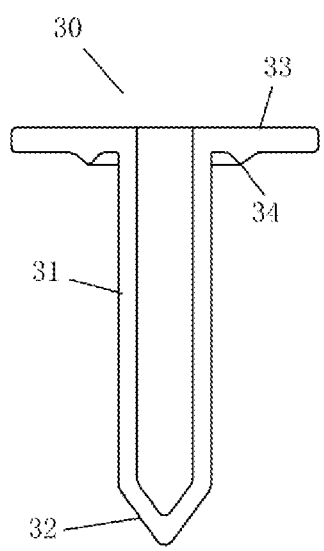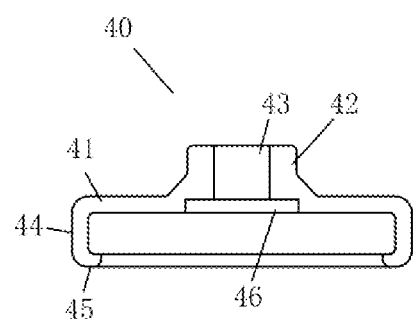
Figure 3
Figure 4
Figure 5
Figure 6

THERMOSTAT FOR CONTROLLING COOLANT CIRCUIT

CROSS-REFERENCE TO RELATED APPLICATION

The present disclosure claims the benefit of priority of co-pending Chinese Patent Application No. 201811462888.5, filed on Dec. 3, 2018, and entitled "Thermostat for Controlling Coolant Circuit," the contents of which are incorporated in full by reference herein.

TECHNICAL FIELD

The disclosure relates to a thermostat for controlling a coolant circuit. The thermostat can be used for controlling various coolant circuits, especially a coolant circuit of an engine.

BACKGROUND

To ensure normal working of an engine, the operation temperature of the engine should be controlled to be in a proper temperature range. An engine is generally equipped with a cooling system for controlling the engine temperature. The cooling system comprises a coolant circuit in which a radiator, such as a grid type radiator, is arranged. The coolant, which is heated up after applying a cooling effect to the engine, can flow through the radiator so that the coolant is cooled down. In the condition that the engine temperature is low, the coolant does not need to flow through the radiator, or only a portion of the coolant needs to flow through the radiator. For this end, a thermostat is generally added in the coolant circuit for the purpose of automatically adjusting the amount of the coolant that enters the radiator based on the level of the coolant temperature. In this way, the circulation range of the coolant can be varied, and the heat dissipation ability of the cooling system can be adjusted. However, if a main valve of the thermostat opens too late, the engine may be over heated; while if the main valve opens too early, the engine temperature may be too low so the engine will undergo a prolonged warm up time, which results in incomplete combustion of the fuel-air mixture, decreased output power, increased fuel consumption, worse lubrication condition, as well as excess emission.

There are various types of thermostats, but some of them have relatively complicate structures, while some of them need to be manufactured in relatively inconvenient manners. Thus, it is desired to provide a thermostat with a relatively simple structure.

SUMMARY

An object of the disclosure is to provide an improved thermostat for controlling a coolant circuit, the thermostat having a simple structure and being able to be manufactured in a easy manner.

For this end, the disclosure provides a thermostat for controlling a coolant circuit comprising: a housing assembly defining an internal cavity therein and first and second inlets for establishing fluid communication between the internal cavity and the coolant circuit; a wax pack arranged in the internal cavity, the wax pack comprising a push bar fixed in the housing assembly and a wax pack body movable by the push bar; a blocking frame configured to be driven by the wax pack body to open/close the first inlet; and a main valve block configured to be driven by the wax pack body and/or the blocking frame to open/close the second inlet; wherein the wax pack body comprises: a casing in which wax is filled; a rubber hose having a cylindrical body inserted in the casing; and a cover having a clamping portion that is clamped onto the casing to seal the rubber hose between the casing and the cover.

According to a possible embodiment of the disclosure, the casing comprises a cylindrical wall and a casing flange extending from one end of the cylindrical wall, the clamping portion of the cover being crimped onto the casing flange.

According to a possible embodiment of the disclosure, a rubber hose flange is formed on one end of the cylindrical body of the rubber hose, the rubber hose flange being clamped in an axial direction between the cover and the casing flange.

According to a possible embodiment of the disclosure, the rubber hose flange comprises a ring of protruded portion which is biased against the end of the cylindrical wall.

According to a possible embodiment of the disclosure, the casing flange comprises a ring of protruded rib which is compressed into the rubber hose flange.

According to a possible embodiment of the disclosure, the cover comprises a flat portion; a peripheral wall extending in one direction from the periphery of the flat portion; and a crimped edge bent radially inwards from the peripheral wall to form the clamping portion.

According to a possible embodiment of the disclosure, the cover further comprises a tube portion extending in an opposite direction from a substantially central position of the flat portion, with a throughhole being formed in the tube portion, the push bar being slidably inserted through the throughhole, and the tube portion having a height which is sufficient to provide guiding to the push bar.

According to a possible embodiment of the disclosure, a sealing ring is arranged between the cover and the rubber hose.

According to a possible embodiment of the disclosure, the casing is a piece formed by pressing stainless steel.

According to a possible embodiment of the disclosure, the main valve block is fixed to the blocking frame, the blocking frame surrounds the casing, and the thermostat further comprises a return spring biasing against the blocking frame.

According to a possible embodiment of the disclosure, the second inlet is coupled with a radiator, and the second inlet has a central axis which is oblique with respect to that of the internal cavity of the housing assembly.

According to the disclosure, a thermostat with a simple structure is constructed. The thermostat is easy to manufacture and is able to precisely control the opening/closing of the main valve and thus precisely control mode shift of the coolant circuit, so a proper operation temperature of the equipment (such as an engine) to be cooled by the coolant can be stably maintained.

BRIEF DESCRIPTION OF THE DRAWINGS

FIG. 3 is a sectional view of a wax pack of the thermostat of the disclosure.

FIGS. 4-6 are views of some main components of the wax pack.

DETAILED DESCRIPTION OF EMBODIMENTS

Now some embodiments of the disclosure will be described with reference to the drawings.

The disclosure in general relates to a thermostat disposed in a cooling system. The cooling system is configured to perform stepwise cooling to equipment, which may be an engine or the like. Therefore, although an engine is used as an example in the description below to embodiments of the disclosure, the principle of the disclosure is also applicable in the cooling of other types of equipment.

Figure 1:
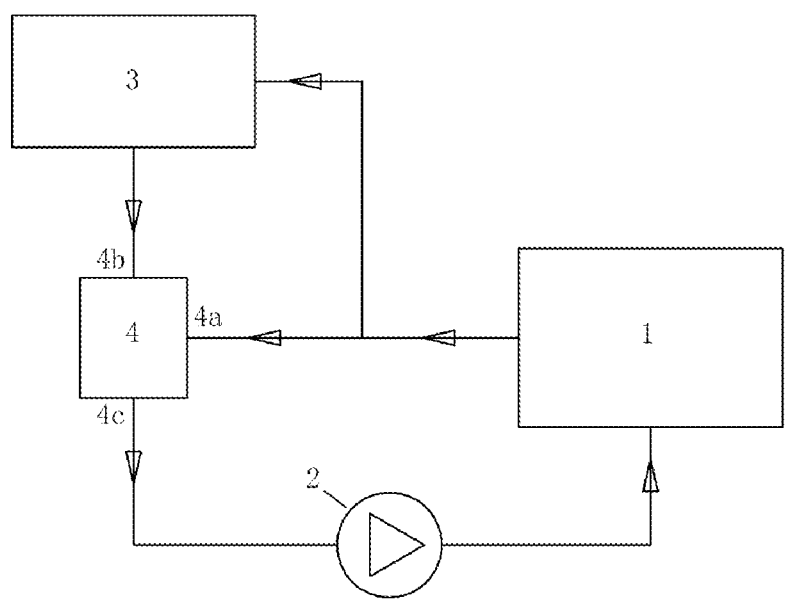
FIG. 1 is a schematic view of an engine cooling system.

FIG. 1 shows a cooling system, in which the principle of the disclosure is implemented, for cooling an engine 1. The cooling system comprises a coolant circuit in which a pump 2, a radiator 3 and a thermostat 4 are arranged. The pump 2 drives a coolant to flow in the coolant circuit as indicated by arrows. The thermostat 4 has a first inlet 4a at the engine side, a second inlet 4b at the radiator side and an outlet 4c. Both the first and second inlets 4a and 4b of the thermostat 4 are openable/closable, so different operation modes of the cooling system can be achieved by the opening and closing of the first and second inlets 4a and 4b of the thermostat 4: the first inlet 4a is open and the second inlet 4b is closed, so the cooling system is in a small circulation mode in which all the coolant leaving the engine 1 flows only through the thermostat 4 and the pump 2 (not through the radiator 3) and then returns back to the engine 1; the first inlet 4a is closed and the second inlet 4b is open, so the cooling system is in a full circulation mode in which all the coolant leaving the engine 1 flows through the radiator 3, the thermostat 4 and the pump 2 and then returns back to the engine 1; the first inlet 4a is partially open and the second inlet is open 4a, so the cooling system is in an intermediate circulation mode in which a portion of the coolant leaving the engine 1 flows through the radiator 3, the thermostat 4 and the pump 2 and then returns back to the engine 1, and another portion of the coolant flows through the thermostat 4 and the pump 2 (not through the radiator 3) and then returns back to the engine 1.

Figure 2:
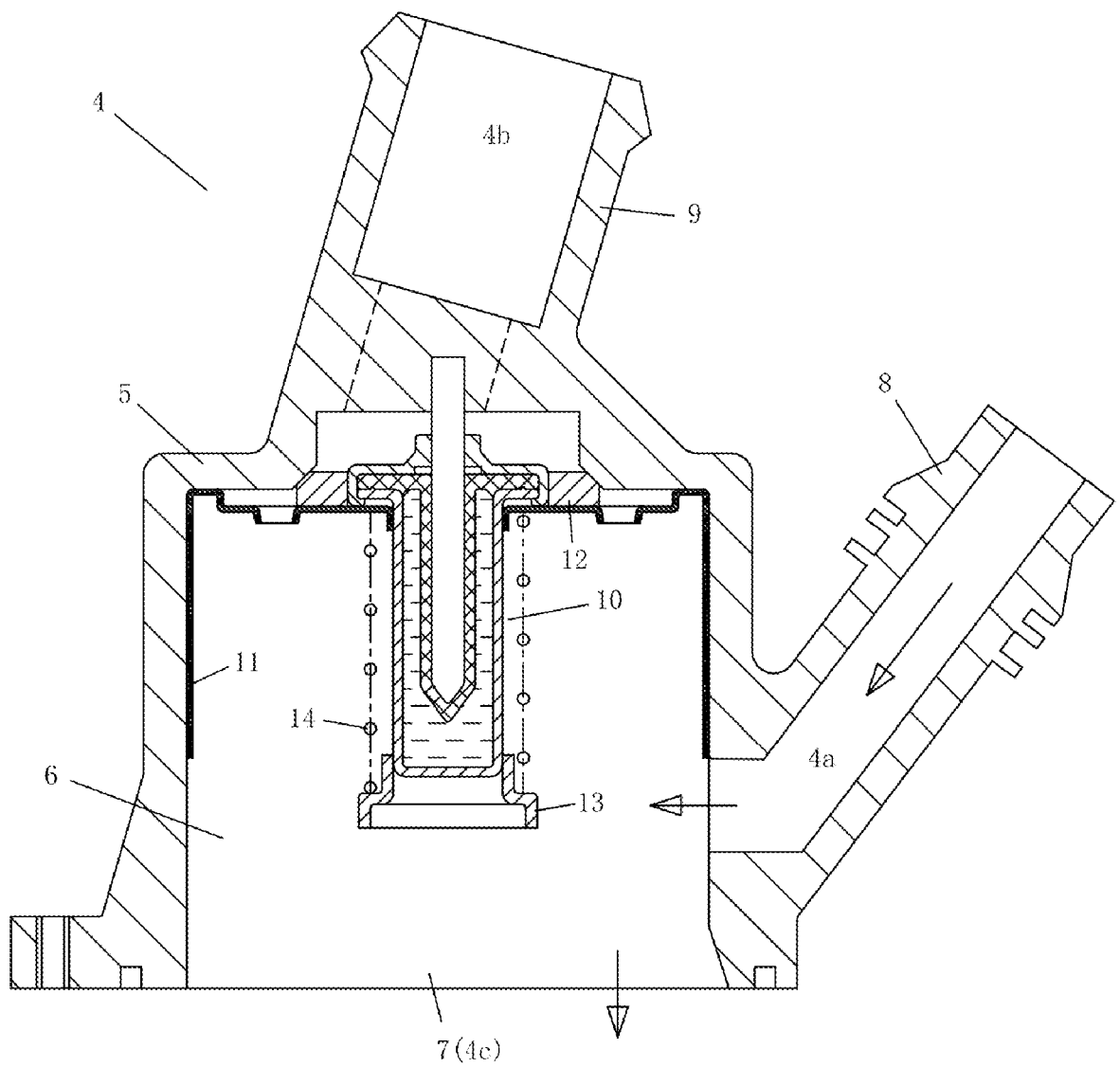
FIG. 2 is a sectional view of a thermostat according to a possible embodiment of the disclosure that can be used in the engine cooling system.

A possible structure of the thermostat 4 of the disclosure is shown in FIG. 2. The thermostat 4 mainly comprises: a housing assembly 5 in which an internal cavity 6 is defined, the internal cavity 6 having an opening 7 forming the outlet 4c; an engine side nozzle 8 in which the first inlet 4a is defined, the first inlet 4a being communicated with the internal cavity 6; a radiator side nozzle 9 in which the second inlet 4b is defined, the second inlet 4b being communicated with the internal cavity 6; a wax pack 10 substantially disposed in the internal cavity 6 and having a pack body of the wax pack 10 movable in the internal cavity 6; a blocking frame (bypass valve element) 11 disposed in the internal cavity 6 and configured to be driven by the pack body of the wax pack 10 for opening and closing the first inlet 4a; a main valve block 12 disposed in the internal cavity 6 and configured to be driven by the pack body of the wax pack 10 and/or the blocking frame 11 for opening and closing the second inlet 4b; a bracket 13 mounted in the internal cavity 6 at a fixed location facing towards the wax pack 10 for achieving the guiding and returning of the pack body of the wax pack 10; a return spring 14 arranged between the bracket 13 and the blocking frame 11 for biasing against the blocking frame 11 to force the blocking frame 11, the pack body of the wax pack 10 and the main valve block 12 to be located at their original positions or returned back to the original positions.

The wax pack 10 has a structure shown in FIG. 3. The pack body of the wax pack 10 comprises a casing 20, a rubber hose 30 and a cover 40. The wax pack 10 further comprises a push bar 50 and a sealing ring 70.

As shown in FIG. 4, the casing 20 is a piece formed by pressing the material, which may be stainless steel, for example, SUS304. The thickness of it may be for example 0.5 mm.

The casing 20 comprises: a bottom wall 21; a cylindrical wall 22 perpendicularly extending from the bottom wall 21; and a flange 23 extending radially outwards from a tip end of the cylindrical wall 22. The flange 23 is substantially perpendicular to the cylindrical wall 22. A side surface of the flange 23 which faces away from the cylindrical wall 22 is formed with a ring of protruded rib 24.

The rubber hose 30 in FIG. 5 is formed by molding a rubber material and comprises: a telescopable cylindrical body 31; a bottom wall 32 formed at an end of the cylindrical body 31; and a flange 33 extending radially outwards from an opposite end of the cylindrical body 31. A side surface of the flange 33 which faces to the bottom wall 23 in the assembled state of the wax pack 10 is formed with a ring of protruded portion of the same rubber material 34. The flange 33 has an outer diameter substantially equals to that of the flange 23.

As shown in FIG. 6, the cover 40 is a piece formed by pressing a sheet metal, for example, formed by pressing a sheet metal having a thickness of about 1.5 mm. The cover 40 comprises: a flat portion 41; a tube portion 42 extending to one side from a substantially central position of the flat portion 41, the tube portion 42 being formed with a throughhole 43 therein, and the throughhole 43 also extending through the flat portion 41; a peripheral wall 44 extending to another side from the periphery of the flat portion 41; and a crimped edge 45 bent radially inwards from the peripheral wall 44. The peripheral wall 44 has an outer diameter substantially equal to or slightly larger than that of the flange 23 shown in FIG. 4 and the flange 33 shown in FIG. 5. The crimped edge 45 is formed in the assembling process of the wax pack 10 by bending a tip end edge of the peripheral wall 44 radially inwards. Further, a sealing ring slot 46 is formed in the flat portion 41, a sealing ring 70 can be mounted in the sealing ring slot. The throughhole 43 is opened into sealing ring slot 46.

With reference to FIG. 3, the wax pack 10 is assembled in a procedure described below. First, an amount of wax 60 in liquid state is poured into the casing 20. The push bar 50 is inserted into an internal space defined in the cylindrical body 31 of the rubber hose 30, with a portion of the push bar 50 exposed outside the cylindrical body 31. The end of the push bar 50 which is inserted into the cylindrical body 31 has a cone or semi-spherical shape and pushes against the bottom wall 32. Then the cylindrical body 31 is inserted into an internal space defined in the cylindrical wall 22 of the casing 20, the flange 33 abuts against the flange 23, and the protruded portion 34 abuts against the tip end of the cylindrical wall 22.

Now the crimped edge 45 has not been formed on the cover 40 yet, and is still in substantially the shape of the tip end edge of the peripheral wall 44. Then, the push bar 50 is inserted through the throughhole 43 of the cover 40, and then the sealing ring 70 is moved over and along the push bar 50 to be pushed into the sealing ring slot 46. The sealing ring 70 functions to improve the sealing between the cover 40 and the rubber hose 30.

Then, the cover 40 is pushed over the flanges 33 and 23 to bring the flanges 33 and 23 into the internal space defined by the peripheral wall 44. Next, the tip end edge of the peripheral wall 44 is bent radially inwards to create the crimped edge 45. Now the crimped edge 45 is clamped onto the flange 23 and creates an axial force to the flanges 33 and 23 to fix the cover 40 and the casing 20 together. The clamping portion here will preferably have a strength to endure a certain pressure in the internal space of the casing 20, for example, 10 MPa.

Now, the assembling of the wax pack 10 is finished.

Since the protruded portion 34 of the rubber hose 30 is pushed against the tip end of the cylindrical wall 22 of the casing 20, sealing between the rubber hose 30 and the casing 20 can be ensured so that leakage of the wax 60 can be prevented. Further, since the rib 24 of the casing 20 faces to the flange 33 of the rubber hose 30 and is pressed into the flange 33, the sealing property between the rubber hose 30 and the casing 20 is further improved.

The throughhole 43 in the tube portion 42 has a diameter slightly larger than the outer diameter of the push bar 50, which allows the push bar 50 to slide axially in the throughhole 43. The tube portion 42 shall has a certain axial height to perform guiding to the sliding of the push bar 50.

As shown in FIG. 2, the main valve block 12 is fixed to the blocking frame 11. A portion of the housing assembly 5 that faces to the main valve block 12 forms a valve seat. In this way, a main valve is formed by the main valve block 12 and the valve seat for controlling the opening/closing of the second inlet 4b. The exposed end of the push bar 50 is inserted into the material of the housing assembly 5 and fixed there. Now the wax pack 10 is mounted inside the housing assembly 5.

Figure 7:
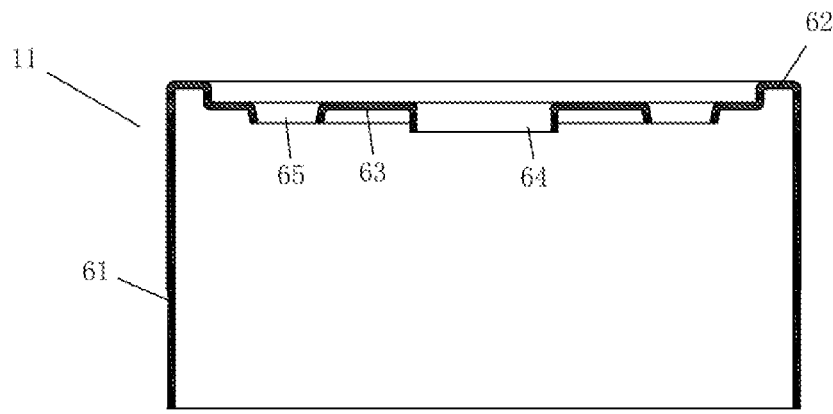
FIG. 7 is a view of a blocking frame of the thermostat of the disclosure.

As shown in FIG. 7, the blocking frame 11 is formed by pressing a sheet metal and comprises: a peripheral wall 61 which is adapted to form a slidable fit with an inner wall surface of the internal cavity 6 of the housing assembly 5 shown in FIG. 2; a ring 62 extending radially inwards from an end of the peripheral wall 61; a flat end wall 63 axially set back by a short distance from the ring 62 towards the opposite end (free end) of the peripheral wall 61; a protrusion 64 extending from a central portion of the end wall 63 towards the free end of the peripheral wall 61, the protrusion 64 forming a hole therein through which the cylindrical wall 22 of the casing 20 shown in FIG. 4 can be inserted; and a plurality of throughholes 65 formed in the end wall 63 around the protrusion 64 for establishing communication between the internal cavity 6 and the second inlet 4b shown in FIG. 2 when the main valve is open.

Returning back to FIG. 2, after the wax pack 10 is mounted in the housing assembly 5, the blocking frame 11 is mounted into the housing assembly 5, with the end wall 63 facing towards the cover 40 and the main valve block 12, and the casing 20 of the wax pack 10 shown in FIG. 4 is inserted through the hole in the protrusion 64 shown in FIG. 7. Next, the return spring 14 is mounted to surround the casing 20 of the wax pack 10, and then the bracket 13 is mounted so that the tip end (the bottom wall 21 and a neighboring portion of the cylindrical wall 22) of the casing 20 shown in FIG. 4 is slidably inserted into the bracket 13. The return spring 14 is axially compressed between the end wall 63 of the blocking frame 11 shown in FIG. 7 and the bracket 13. The return spring 14 acts to push against the end wall 63 of the blocking frame 11, with the plurality of throughholes 65 located radially outside of the main valve block 12.

Finally, the bracket 13 is fixed in the housing assembly 5. Now the whole thermostat 4 is assembled.

After the thermostat 4 is mounted into the cooling system shown in FIG. 1, a coolant flows into the internal cavity 6 of the housing assembly 5 so the wax pack 10 is immersed in the coolant. Now the temperature of the coolant can be transmitted to the wax pack 10.

In the condition that the temperature of the wax 60 in the wax pack 10 is lower than a first threshold temperature (e.g., substantially equals to the melting point of the wax 60, for example, is about 90° C.), the wax 60 remains in a solid state. Now as shown in FIG. 2, under the pushing action of the return spring 14, the pack body of the wax pack 10 and the main valve block 12 are kept in their original positions, and the main valve block 12 and the valve seat are closed together so that the main valve is in a closed state and thus the second inlet 4b (the radiator side nozzle 9) is closed. On the other hand, when the tip end of the peripheral wall 61 of the blocking frame 11 has not reached the first inlet 4a, then the first inlet 4a remains open. In this configuration, in the thermostat 4, the coolant from the engine 1 (not passing through the radiator 3) can enter the internal cavity 6 via the first inlet 4a (the engine side nozzle 8) and then leaves the internal cavity 6 via the outlet 4c (the opening 7), as indicated by arrows in FIG. 2. When the thermostat 4 is in this configuration, the cooling system conducts a small circulation operation.

Figure 8:
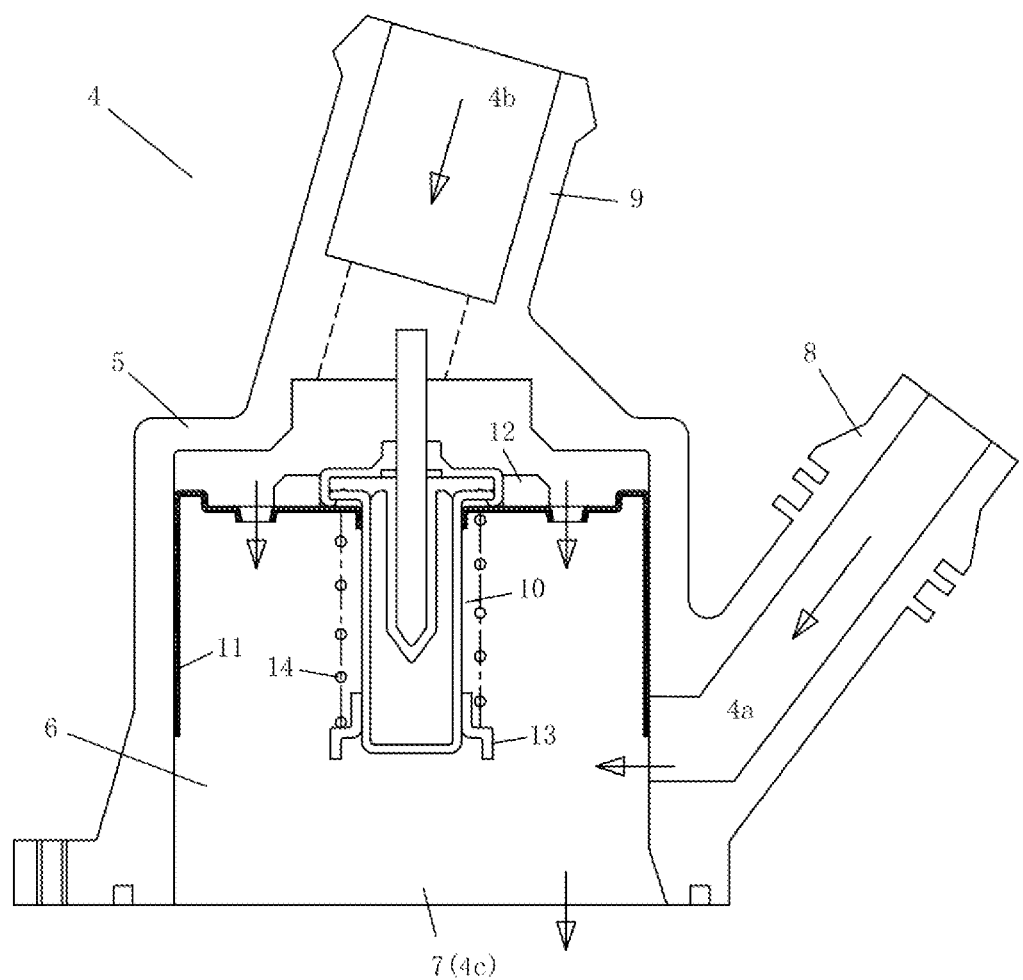
FIGS. 8 and 9 are views of two operation states of the thermostat of the disclosure.

When the coolant temperature is increased to the first threshold temperature, the wax 60 in the wax pack 10 becomes melted so that the volume of the wax 60 becomes enlarged, which results in increasing of the pressure in the internal space of the casing 20. Due to the elasticity of the rubber hose 30, the bottom wall 32 of the rubber hose 30 is pushed by the wax 60 so the cylindrical body 31 shrinks in the axial direction. Since the push bar 50 is fixed, the axial shrinkage of the bottom wall 32 results in axial sliding of the pack body of the wax pack 10 and the blocking frame 11 towards the opening 7 with respect to the push bar 50 (overcoming the push force of the return spring 14) to reach a state shown in FIG. 8. Now the peripheral wall 61 of the blocking frame 11 closes a portion of the first inlet 4a, but the first inlet 4a still remains partially open, so a portion of the coolant from the engine (not passing through the radiator 3) can enter the internal cavity 6 via the first inlet 4a and then leaves the internal cavity 6 via the outlet 4c. On the other hand, the blocking frame 11 brings the main valve block 12 to leave the valve seat to open the main valve, so another portion of the coolant from the engine (has passed through the radiator 3) can enter the internal cavity 6 via the second inlet 4b and then leaves the internal cavity 6 via the outlet 4c. When the thermostat 4 is in this configuration, the cooling system conducts an intermediate circulation operation. The flow paths of the coolant in the thermostat 4 in the intermediate circulation operation is indicated by arrows in FIG. 8.

Figure 9:
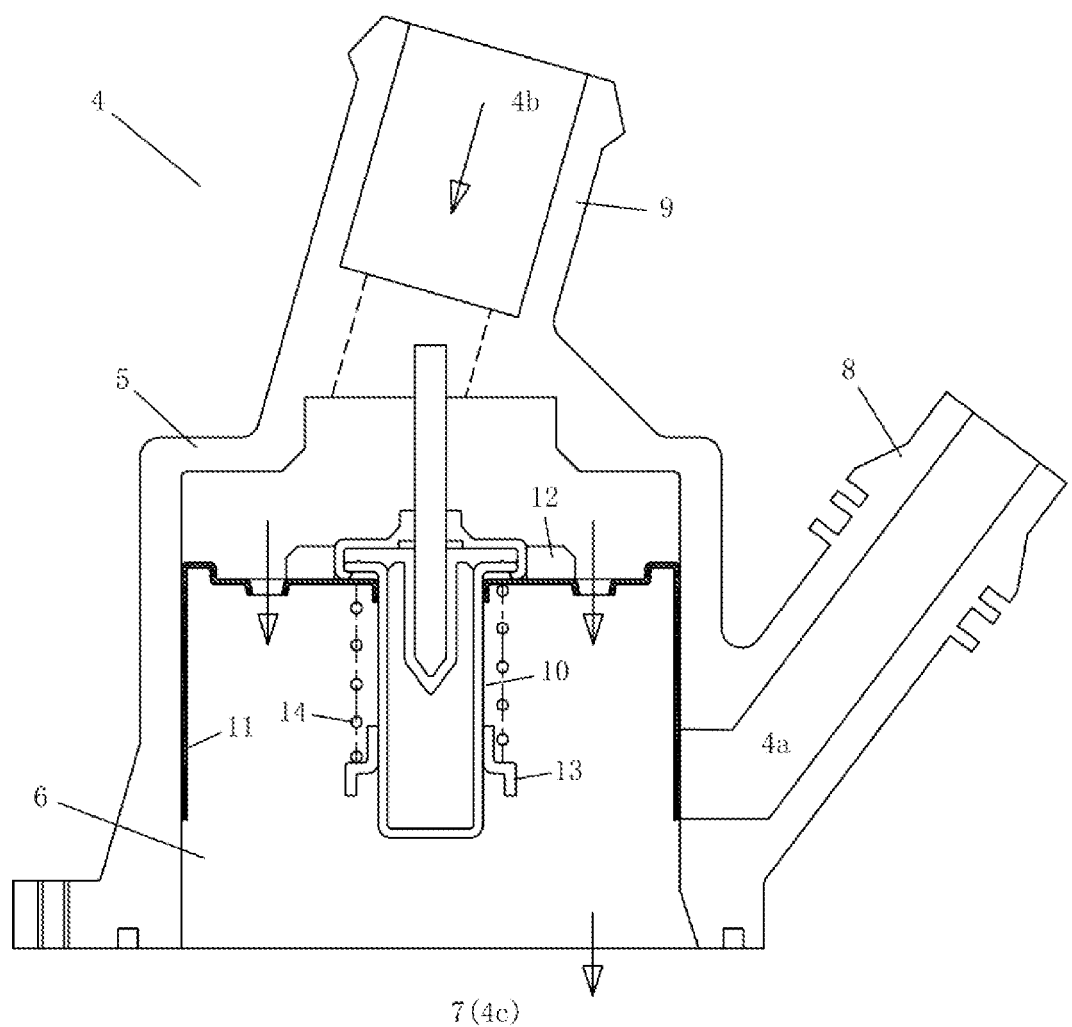

With the temperature of the coolant further increases, the volume of the wax 60 is further enlarged, and the pack body of the wax pack 10 and the blocking frame 11 further slide axially towards the opening 7. When the coolant temperature is increased to a second threshold temperature (higher than the first threshold temperature, for example, the second threshold temperate is approximately 105° C.), the pack body of the wax pack 10 and the blocking frame 11 axially slide towards the opening 7 (overcoming the push force of the return spring 14) so that the peripheral wall 61 of the blocking frame 11 fully closes the first inlet 4a, as shown in FIG. 9. Now only the main valve is open in the thermostat 4 so the coolant from the engine (has passed through the radiator 3) can enter the internal cavity 6 via the second inlet 4b and then leaves the internal cavity 6 via the outlet 4c. When the thermostat 4 is in this configuration, the cooling system conducts a full circulation operation. The flow paths of the coolant in the thermostat 4 in the full circulation operation is indicated by arrows in FIG. 8.

When the coolant temperature is decreased, under the action of the push force of the return spring 14, the pack body of the wax pack 10 (and the main valve block 12 and the blocking frame 11) is moved backwards, so the operation can be transmitted to the intermediate circulation operation and the full circulation operation.

In the thermostat 4, the central axis of the second inlet 4*b* (the radiator side nozzle 9) may be oblique with respect to the central axis of the internal cavity 6 to prevent the coolant from the second inlet 4*b* from directly impacting the pack body of the wax pack 10 which may cause vibration.

It can be seen that the disclosure provides a thermostat 4 having a simple structure. The thermostat is able to precisely control the opening/closing of the main valve and thus achieve mode shift of the coolant circuit in the cooling system, so a proper operation temperature of the engine or other equipment to be cooled by the coolant can be stably maintained.

Further, regarding the clamping structure between the cover 40 and the casing 20, the clamping portion (the crimped edge 45) of the disclosure is formed on the cover 40, not on the casing 20. In the case that the clamping portion is formed on the casing 20, the casing 20 needs to undergo a first, deep drawing process to form the cylindrical wall 22, and thus the stiffness of the flange 23 is very high; and then for forming the clamping portion on the flange 23, a second drawing process is needed. Such a process with two steps of drawing is difficult. The cover 40 itself has a relatively simple structure, and it is relatively convenient to form the clamping structure on the flat portion 41, so the process difficulty is reduced.

The cover 40 can be made of a thin sheet metal, and the tube portion 42 may have the same thickness with the flat portion 41. Thus, the weight of the cover 40 can be reduced, and the cost of this component will be reduced. The tube portion 42 (with the throughhole 43) of the cover 40 can be formed through a precise punching process. Thus, the tube portion 42 is formed in a general manufacturing process, no special manufacturing process is needed, so production efficiency is increased, while manufacturing costs are reduced.

Further, the material of the casing 20 may be stainless steel, for example, SUS304. The steel or other metallic material used preferably in the disclosure can result in reduction of thickness, lowering the weight and reducing material and manufacturing costs. In addition, corrosion resistance is increased, so the service life of the thermostat can be prolonged. Thus, replacements of consumable parts can be reduced, so the costs associated with materials are reduced.

In addition, by using stainless steel, risks in the cooling system caused by electrochemical reaction of copper and aluminum can be avoided.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A thermostat for controlling a coolant circuit, the thermostat comprising:
a housing assembly defining an internal cavity therein and first and second inlets for establishing fluid communication between the internal cavity and the coolant circuit, the internal cavity having an opening forming an outlet;
a wax pack arranged in the internal cavity, the wax pack comprising a push bar fixed in the housing assembly and a wax pack body movable by the push bar;
a blocking frame fixed against the housing assembly and configured to be driven by the wax pack body to open/close the first inlet;
a main valve block configured to be driven by the wax pack body and/or the blocking frame to open/close the second inlet; and
a return spring biased against the blocking frame in a direction towards original positions of the main valve block and the blocking frame;
wherein the wax pack body comprises:
a casing in which wax is filled;
a rubber hose having a cylindrical body inserted in the casing to be surrounded by the wax; and
a cover having a clamping portion that is clamped onto the casing to seal the rubber hose between the casing and the cover; and
wherein the blocking frame surrounds the casing.

2. The thermostat of claim 1, wherein the casing comprises a cylindrical wall and a casing flange extending from one end of the cylindrical wall, the clamping portion of the cover being crimped onto the casing flange.

3. The thermostat of claim 2, wherein a rubber hose flange is formed on one end of the cylindrical body of the rubber hose, the rubber hose flange being clamped in an axial direction between the cover and the casing flange.

4. The thermostat of claim 3, wherein the rubber hose flange comprises a ring of protruded portion which is biased against the one end of the cylindrical wall.

5. The thermostat of claim 3, wherein the casing flange comprises a ring of protruded rib which is compressed into the rubber hose flange.

6. The thermostat of claim 1, wherein the cover comprises a flat portion; a peripheral wall extending in one direction from an outer periphery of the flat portion; and a crimped edge bent radially inwards from the peripheral wall to form the clamping portion.

7. The thermostat of claim 6, wherein the cover further comprises a tube portion extending in an opposite direction from a substantially central position of the flat portion, with a throughhole being formed in the tube portion, the push bar being slidably inserted through the throughhole, and the tube portion having a height which is sufficient to guide the push bar.

8. The thermostat of claim 1, wherein a sealing ring is arranged between the cover and the rubber hose.

9. The thermostat of claim 1, wherein the casing is a piece formed by pressing stainless steel.

10. The thermostat of claim 1, wherein the second inlet is coupled with a radiator, and the second inlet has a central axis which is oblique with respect to that of the internal cavity of the housing assembly.

11. A vehicle comprising:
a thermostat for controlling a coolant circuit, the thermostat comprising:
a housing assembly defining an internal cavity therein and first and second inlets for establishing fluid communication between the internal cavity and the coolant circuit, the internal cavity having an opening forming an outlet;

a wax pack arranged in the internal cavity, the wax pack comprising a push bar fixed in the housing assembly and a wax pack body movable by the push bar;

a blocking frame fixed against the housing assembly and configured to be driven by the wax pack body to open/close the first inlet;

a main valve block configured to be driven by the wax pack body and/or the blocking frame to open/close the second inlet; and a return spring biased against the blocking frame in a direction towards original positions of the main valve block and the blocking frame;

wherein the wax pack body comprises:

a casing in which wax is filled;

a rubber hose having a cylindrical body inserted in the casing to be surrounded by the wax; and a cover having a clamping portion that is clamped onto the casing to seal the rubber hose between the casing and the cover; and wherein the blocking frame surrounds the casing.

12. The vehicle of claim 11, wherein the casing comprises a cylindrical wall and a casing flange extending from one end of the cylindrical wall, the clamping portion of the cover being crimped onto the casing flange.

13. The vehicle of claim 12, wherein a rubber hose flange is formed on one end of the cylindrical body of the rubber hose, the rubber hose flange being clamped in an axial direction between the cover and the casing flange.

14. The vehicle of claim 13, wherein the rubber hose flange comprises a ring of protruded portion which is biased against the one end of the cylindrical wall.

15. The vehicle of claim 13, wherein the casing flange comprises a ring of protruded rib which is compressed into the rubber hose flange.

16. The vehicle of claim 11, wherein the cover comprises a flat portion; a peripheral wall extending in one direction from an outer periphery of the flat portion; and a crimped edge bent radially inwards from the peripheral wall to form the clamping portion.

17. The vehicle of claim 16, wherein the cover further comprises a tube portion extending in an opposite direction from a substantially central position of the flat portion, with a throughhole being formed in the tube portion, the push bar being slidably inserted through the throughhole, and the tube portion having a height which is sufficient to guide the push bar.

18. The vehicle of claim 11, wherein a sealing ring is arranged between the cover and the rubber hose.

19. The vehicle of claim 11, wherein the casing is a piece formed by pressing stainless steel.

20. The vehicle of claim 11, wherein the second inlet is coupled with a radiator, and the second inlet has a central axis which is oblique with respect to that of the internal cavity of the housing assembly.

* * * * *